United States Patent
Choi et al.

(10) Patent No.: US 10,454,130 B2
(45) Date of Patent: Oct. 22, 2019

(54) POUCH CASING MATERIAL FOR SECONDARY BATTERY

(71) Applicant: LG Chem, Ltd., Seoul (KR)

(72) Inventors: Mi-Geum Choi, Daejeon (KR); Hang-June Choi, Daejeon (KR); Jeong-O Mun, Daejeon (KR)

(73) Assignee: LG Chem, Ltd. (KR)

( * ) Notice: Subject to any disclaimer, the term of this patent is extended or adjusted under 35 U.S.C. 154(b) by 16 days.

(21) Appl. No.: 15/747,654

(22) PCT Filed: Nov. 3, 2016

(86) PCT No.: PCT/KR2016/012609
§ 371 (c)(1),
(2) Date: Jan. 25, 2018

(87) PCT Pub. No.: WO2017/078437
PCT Pub. Date: May 11, 2017

(65) Prior Publication Data
US 2018/0219245 A1  Aug. 2, 2018

(30) Foreign Application Priority Data
Nov. 3, 2015 (KR) .................. 10-2015-0154006

(51) Int. Cl.
*H01M 10/04* (2006.01)
*H01M 10/058* (2010.01)
*H01M 2/02* (2006.01)

(52) U.S. Cl.
CPC ....... *H01M 10/045* (2013.01); *H01M 2/0275* (2013.01); *H01M 10/058* (2013.01)

(58) Field of Classification Search
CPC .................................................. H01M 2/0275
See application file for complete search history.

(56) References Cited

U.S. PATENT DOCUMENTS

2005/0191549 A1* 9/2005 Kang .................. H01M 2/021
429/185
2009/0311592 A1 12/2009 You et al.
(Continued)

FOREIGN PATENT DOCUMENTS

EP 2602840 A2 6/2013
JP 2007200589 A 8/2007
(Continued)

OTHER PUBLICATIONS

Extended European Search Report for Application No. EP16862453.4 dated May 9, 2018.
(Continued)

*Primary Examiner* — Imran Akram
(74) *Attorney, Agent, or Firm* — Lerner, David, Littenberg, Krumholz & Mentlik, LLP (57) ABSTRACT

The present disclosure relates to a pouch casing material including two cups forming an electrode assembly receiving portion and formed integrally in one pouch film. The pouch casing material includes an upper pouch member and a lower pouch member formed integrally with each other, and the connection between the upper pouch member and the lower pouch member does not protrude toward the outside. Thus, the total length of a battery is reduced.

8 Claims, 6 Drawing Sheets

(56) References Cited

U.S. PATENT DOCUMENTS

2012/0040235 A1* 2/2012 Cho ................... H01M 2/0207
429/156
2013/0323563 A1 12/2013 Eo
2014/0220387 A1 8/2014 Lee

FOREIGN PATENT DOCUMENTS

| KR | 100869377 B1 | 11/2008 |
| KR | 20120051424 A | 5/2012 |
| KR | 20130133585 A | 12/2013 |
| KR | 20140100108 A | 8/2014 |

OTHER PUBLICATIONS

Search report from International Application No. PCT/KR2016/012609, dated Feb. 28, 2017.

* cited by examiner

POUCH CASING MATERIAL FOR SECONDARY BATTERY

CROSS-REFERENCE TO RELATED APPLICATIONS

The present application is a national phase entry under 35 U.S.C. § 371 of International Application No. PCT/KR2016/012609 filed Nov. 3, 2016, which claims priority to Korean Patent Application No. 10-2015-0154006 filed on Nov. 3, 2015, the disclosures of which are incorporated herein by reference.

TECHNICAL FIELD

The present disclosure relates to a pouch casing material with which an electrode assembly is enclosed. More particularly, the present disclosure relates to a pouch casing material including two cups forming an electrode assembly receiving portion and formed integrally in one pouch film.

BACKGROUND ART

In recent times, as portable electronic appliances, such as notebook computers, video cameras and cellular phones, have been in increasingly in demand and development of electric vehicles, energy storage capacitors, robots and satellites have been regularized, active studies have been conducted about high-performance secondary batteries capable of repeating charging/discharging.

Recently, commercially available secondary batteries include nickel cadmium batteries, nickel metal hydride batteries, nickel zinc batteries and lithium secondary batteries. Among those, lithium secondary batteries cause little memory effect as compared to nickel-based secondary batteries to allow free charging/discharging, have a significantly low self-discharge ratio and high energy density, and thus have been given many attentions. In general, the secondary batteries may be classified into can-type secondary batteries and pouch-type secondary batteries, depending on the type of a casing or application.

Figure 1:
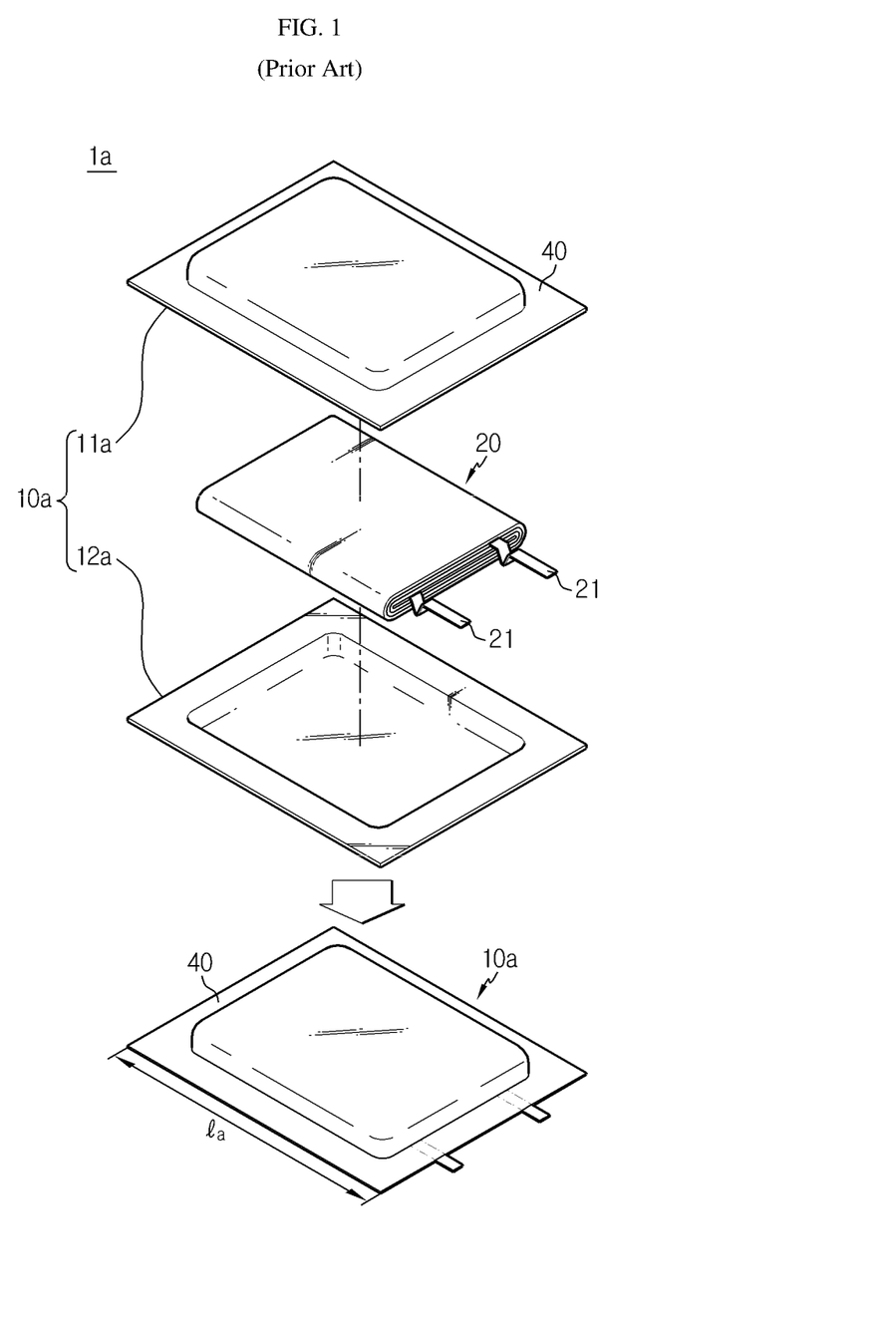
FIG. 1 is an exploded perspective view illustrating the structure of a conventional pouch casing material.
Figure 2A:
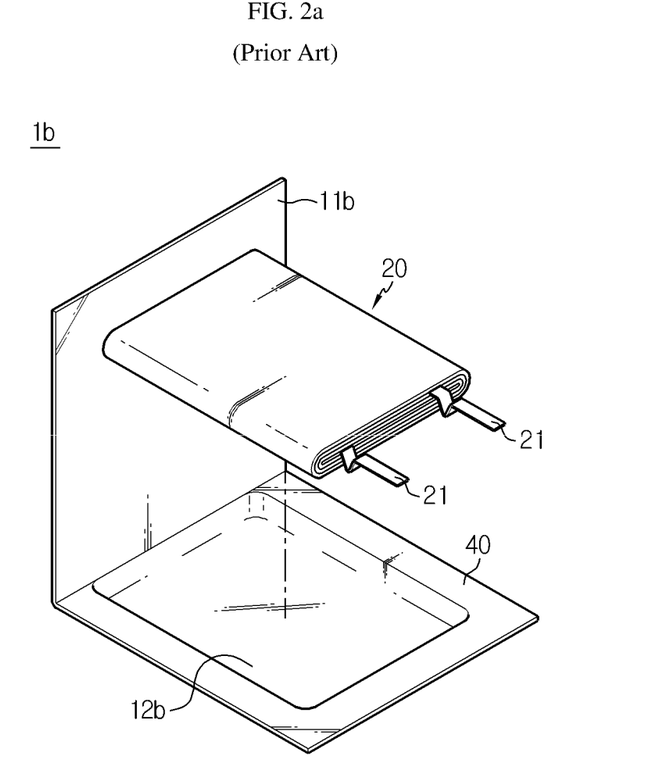
FIG. 2a and FIG. 2b are exploded perspective views illustrating the structure of a conventional pouch casing material.

FIG. 1 and FIG. 2a are exploded perspective views illustrating the structure of the conventional pouch-type secondary battery. As shown in FIG. 1, the conventional pouch-type secondary battery 1a includes an electrode assembly 20 having electrode terminals 21 and a pouch casing member 10a configured to receive the electrode assembly 20.

Referring to FIG. 1, sealing portions 40 are provided at the circumference of the electrode receiving portion and the total length La of the battery is determined by the length of the electrode assembly receiving portion and the width of the two sealing portions 40 provided at both ends of the electrode assembly receiving portion. Therefore, when an upper pouch member 11a and a lower pouch member 12a are provided individually as shown in FIG. 1, sealing portions are formed at all of the four sides of the electrode assembly receiving portion, and thus the total length is increased by the width of the sealing portions.

Figure 2B:
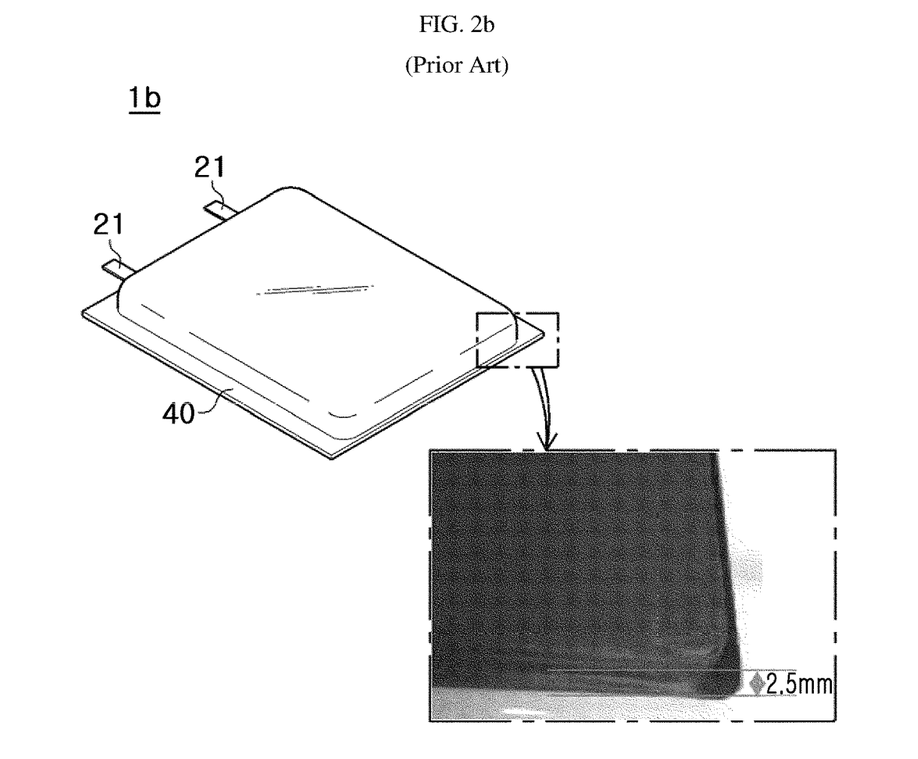

FIG. 2a is an exploded perspective view of another type of conventional pouch-type secondary battery 1b, wherein an upper pouch member and a lower pouch member are formed integrally in one pouch film. Referring to FIG. 2a, an electrode assembly receiving portion is formed in one pouch member, a predetermined portion of the pouch film is folded, the opening of the electrode assembly receiving portion is covered with the other pouch member, and then the upper pouch member and the lower pouch member are sealed. In this case, sealing portions are formed at the three lateral side portions, except the connection between the upper pouch and the lower pouch. The secondary battery 1b has a total length La decreased by the width of one sealing portion, as compared to the secondary battery 1a. However, in the case of the connection having no sealing portion, a part thereof protrudes toward the outside undesirably, after sealing. FIG. 2b is a photographic image illustrating an actual embodiment of the secondary battery type 1b, wherein a folding portion where the upper pouch member is connected with the lower pouch member protrudes. As a result, even when forming the pouch casing material in the type of secondary battery 1b, there is no significant effect of reducing the total length as compared to the secondary battery 1a. It is thought that this phenomenon is caused since the regions of the upper pouch member and the lower pouch member around the connected portion come into contact with each other due to the vacuum applied to prevent air from remaining in a battery upon sealing, after injecting an electrolyte into a pouch casing material.

Therefore, there is a need for developing a pouch casing material configured to prevent protrusion of a connection between an upper pouch member and a lower pouch member after sealing.

DISCLOSURE

Technical Problem

The present disclosure is designed to solve the problems of the related art, and therefore the present disclosure is directed to providing a pouch casing material including an upper pouch member and a lower pouch member formed integrally with each other, wherein the connection between the upper pouch member and the lower pouch member does not protrude toward the outside after sealing. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

The present disclosure provides a pouch casing material capable of solving the above-mentioned technical problem.

According to a first embodiment of the present disclosure, there is provided a pouch casing material which includes a first cup and a second cup stacked in such a manner that the insides of the cups face each other to form an electrode assembly receiving portion capable of enclosing an electrode assembly, the first cup and the second cup are spaced apart from each other with a cup connection having a predetermined width W interposed therebetween, and sealing portions extended from the cups and cup connection are formed integrally on the outer circumferential surface of the pouch casing material; each of the cups includes a first lateral side portion extended from the cup connection and a second lateral side portion facing the first lateral side portion; and the sum of the height Ha1 of the first lateral side portion of the first cup, the height Ha2 of the first lateral side portion of the second cup and the width W equals to the sum of the height Hb1 of the second lateral side portion of the first cup and the height Hb2 of the second lateral side portion of the second cup.

According to a second embodiment, there is provided a pouch casing material of the first embodiment, wherein the electrode terminals of the electrode assembly enclosed in the pouch casing material are drawn out from the gap of the sealing portions extended from the second lateral side portions of the first cup and the second cup.

According to a third embodiment, there is provided a pouch casing material of the first embodiment or the second embodiment, wherein the first lateral side portion and the second lateral side portion of each of the cups are connected with each other through two third lateral side portions facing each other.

According to a fourth embodiment, there is provided a pouch casing material of the third embodiment, wherein the length of the side connected to the first lateral side portion is shorter than the length of the side connected to the second lateral side, in the third lateral side portion.

According to a fifth embodiment, there is provided a pouch casing material of the third embodiment, wherein a step compensating portion configured to compensate for a difference in height of the first lateral side portion from the second lateral side portion is provided between the third lateral side portion and the sealing portion, wherein the step compensating portion is formed as a triangle sharing one side with the third lateral side portion.

According to a sixth embodiment, there is provided a pouch casing material of the fifth embodiment, wherein the length of one side of the step compensating portion extended from one side of the first lateral side portion equals to or larger than the difference in height of the first lateral side portion from that of the second lateral side portion.

According to a seventh embodiment, there is provided a pouch casing material of the fifth embodiment, wherein the third lateral side portion and the step compensating portion form one inner side portion of the electrode assembly receiving portion of the pouch casing material.

According to an eighth embodiment, there is provided a pouch casing material of the fifth embodiment, wherein the step compensating portion protrudes out from the plane of the third lateral side portion toward the outside, when assembling the pouch casing material.

According to a ninth embodiment, there is provided a pouch casing material of the fifth embodiment, wherein the first step compensating portion of the first cup, the step compensating portion of the second cup, the sealing portion and the cup connection individually share one side with a rectangular folding portion and are connected one another through the folding portion.

According to a tenth embodiment, there is provided a pouch casing material of any one of the first embodiment to the ninth embodiment, wherein the folding portion is folded toward the inside of the pouch casing material when the electrode assembly is enclosed, and thus does not protrude toward the outside.

Advantageous Effects

The pouch casing material according to the present disclosure includes an upper pouch member and a lower pouch member formed integrally with each other, and the connection between the upper pouch member and the lower pouch member does not protrude toward the outside. Thus, the total length of a battery is reduced.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing. Meanwhile, the shape, size, scale or proportion of an element in the accompanying drawings may be exaggerated for the purpose of more clear description.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The present disclosure relates to a pouch casing material for a secondary battery. The pouch casing material includes a first cup and a second cup formed in one pouch film and the cups are spaced apart from each other with a cup connection having a predetermined width interposed therebetween. According to an embodiment, the first cup and the second cup are stacked in such a manner that the insides of the cups face each other to form an electrode assembly receiving portion capable of receiving an electrode assembly. In addition, the outer circumferential surface of the pouch casing material is provided with sealing portions extended from the first cup, the second cup and the cup connection.

Figure 3:
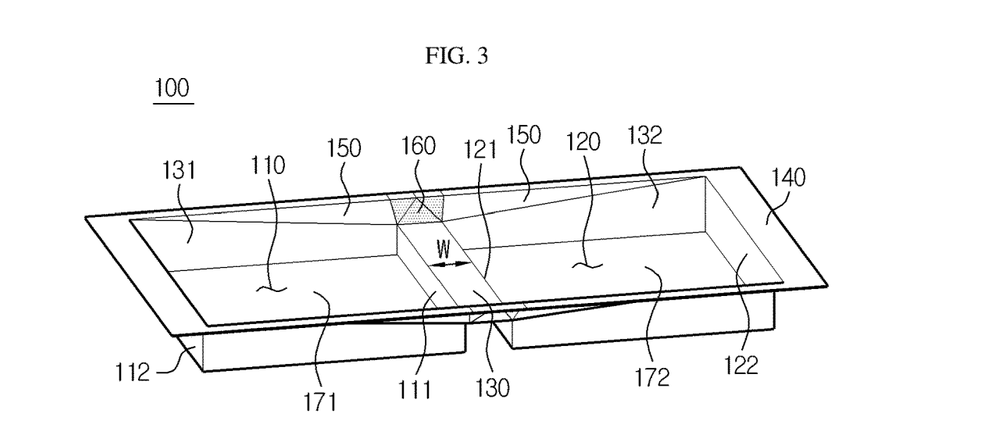
FIG. 3 is an exploded perspective view illustrating the structure of the pouch casing material according to the present disclosure.

FIG. 3 is a perspective view illustrating a pouch casing material according to an embodiment of the present disclosure. Referring to FIG. 3, the pouch casing material 100 includes a first cup 110 and a second cup 120 in one pouch film, and a cup connection 130 having a predetermined width is provided between the first cup and the second cup. In other words, the first cup 110 and the second cup 120 are spaced apart from each other by the width W of the cup connection 130. The pouch casing material 100 is folded along an imaginary folding line positioned at the connection between the cups 110, 120 and the cup connection 130 so that the first cup and the second cup may be stacked to form an electrode assembly receiving portion. The folding line may be the side shared by the first cup and the cup connection and/or the side shared by the second cup and the cup connection. In addition, sealing portions 140 having a predetermined width are formed on the outer circumferential surface of the pouch casing material. Thus, the first cup and the second cup are stacked in such a manner that the sealing portion of the first cup faces that of the second cup. Then, the sealing portions are heated to seal the pouch casing material.

In the accompanying drawings, the end portion indicated by a wavy line (~) means the space corresponding to the portion indicated by the line.

Herein, the bottom surfaces 171, 172 of the first cup and the second cup form the top surface and bottom surface, respectively, in the secondary battery obtained by sealing with the pouch casing material. In addition, in the pouch casing material, the second lateral side portions 112, 122 are connected to the sealing portions to form the top side surface of the secondary battery, the third lateral side portions 131, 132 are connected to the sealing portions to form the left side surface or right side surface of the secondary battery, and the first lateral side portions 111, 121 form the bottom side surface together with the cup connection. As used herein, 'top', 'bottom', 'left' and 'right' are used in relative concepts and do not define absolute positions. For example, referring to FIG. 5, in the secondary battery sealed with the pouch casing material, the portion from which electrode terminals are drawn is the top side surface, the portion opposite to the top side surface and including the cup connection is the bottom side surface, and the lateral sides having the sealing portion, except the top side surface and the bottom side surface, are the left side surface and right side surface.

Figure 4:
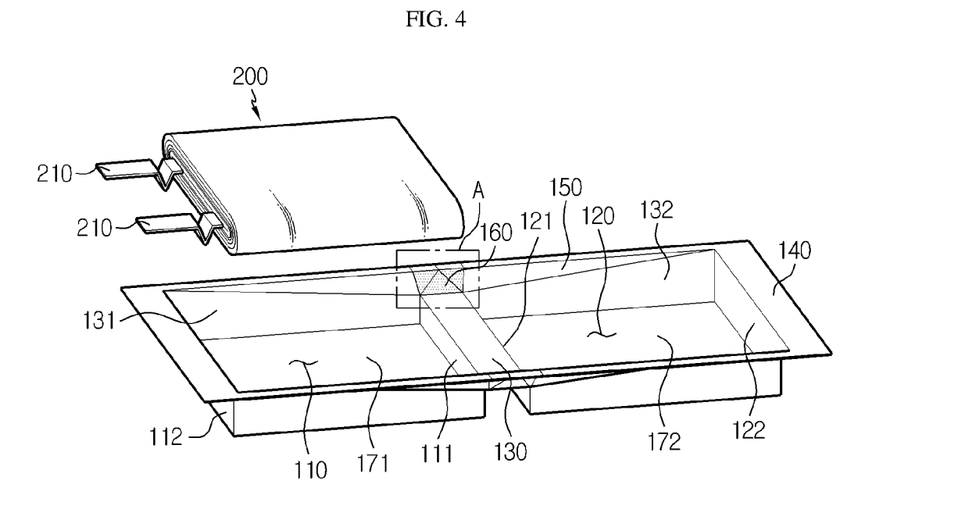
FIG. 4 is a schematic view illustrating a particular embodiment of an electrode assembly received in the pouch casing material according to the present disclosure.

FIG. 4 shows an embodiment of an electrode assembly 200 received in the pouch casing material 100. According to an embodiment of the present disclosure, the pouch casing material 100 may be formed in a shape configured to receive a rectangular parallelepiped-shaped electrode assembly. Herein, only the three sides (top side surface, left side surface and right side surface) among the four sides of the pouch casing material are open and the remaining side (bottom side surface) is connected through the connection and is not open. Thus, it is preferred to prepare the electrode terminals of the electrode assembly to be drawn from the three open sides. Referring to FIG. 4, the electrode assembly 200 is formed in such a manner that the electrode terminals are drawn from the top side surface.

According to an embodiment, the first cup 110 and the second cup 120 include the first lateral side portions 111, 121 extended from the cup connection 130 and the second lateral side portions 112, 122 facing the first lateral side portions. The sum of the height Ha1 of the first lateral side portion 111 of the first cup, the height Ha2 of the first lateral side portion 121 of the second cup and the width W equals to the sum of the height Hb1 of the second lateral side portion 112 of the first cup and the height Hb2 of the second lateral side portion 122 of the second cup. In addition, the first lateral side portions and the second lateral side portions in the cups are connected through two third lateral side portions 131, 132.

Figure 5:
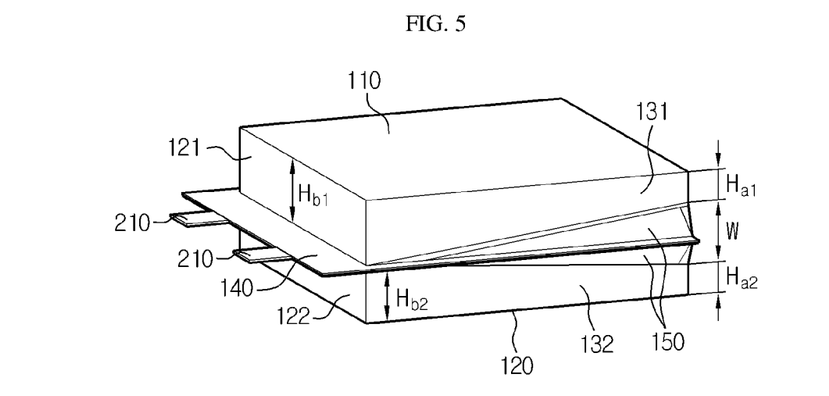
FIG. 5 is an assembly drawing illustrating an electrode assembly received in the pouch casing material according to the present disclosure, after sealing.

FIG. 5 shows the pouch casing material 100 according to an embodiment, after sealing. In general, the height of the first cup and that of the second cup in the pouch casing material are determined considering the height of an electrode assembly to be received. Typically, the first cup may have a height obtained by subtracting the height of the second cup from the height of the electrode assembly. In addition, an adequate space margin is determined and added to the height of the first cup. Otherwise, the height of each cup may be ½ of the predetermined thickness of a battery. When applying the determined height of the cup to the whole sides, for example, four sides of the cup, the above-mentioned protrusion may be formed at the connection between one cup and another cup. The present disclosure is intended to solve the problem. According to the present disclosure, the heights of lateral side portions of a cup are set to different heights, the height of the lateral side portion (first lateral side portion) extended from the cup connection is set to be lower than the position (height) of the lateral side portion (second lateral side portion) facing the first lateral side portion, and the difference in height between the first lateral side portion and the second lateral side portion is compensated for by the cup connection.

Referring to FIG. 5, after sealing the pouch casing material 100, the cup connection 130 forms the bottom side surface of the secondary battery together with the first lateral side portion of the first cup and the first lateral side portion of the second cup. Thus, even when applying vacuum upon sealing, it is possible to prevent protrusion from the lateral sides of the secondary battery toward the outside.

According to an embodiment, the first lateral side portion and the second lateral side portion are connected with each other through the third lateral side portion. Therefore, the length of the side connected with the first lateral side portion in the third lateral side portion may be shorter than the length of the side connected with the second lateral side portion.

According to an embodiment, the pouch casing material 100 is provided with a step compensating portion 150 configured to compensate for the difference in height of the first lateral side portion from the second lateral side portion, between the third lateral side portion and the sealing portion. The step compensating portion is formed as a triangle sharing one side with the third lateral side portion.

In the pouch casing material 100, the third lateral side portions 131, 132 form one lateral side portion of the secondary battery. In the third lateral side portions, since the length of the side (first side) shared by the first lateral side portions 111, 121 is different from the length of the side (second side) shared by the second lateral side portions 112, 122, a compensating surface capable of compensating for such a difference in length is required. According to an embodiment of the present disclosure, the pouch casing material is provided with a step compensating portion 150 in order to compensate for the difference in length between the first side and the second side. According to an embodiment of the present disclosure, the length of the step compensating portion 150 extended from one side of the first lateral side portion may be the same as the difference in height between the first lateral side portion and the second lateral side portion, or may be longer than the difference in height. In the latter case, the step compensating portion may protrude out from the plane of the third lateral side portion toward the outside, after sealing with the pouch casing material. According to an embodiment of the present disclosure, the third lateral side portion and the step compensating portion form the left side surface and the right side surface of the electrode assembly receiving portion of the pouch casing material.

According to an embodiment of the present disclosure, in the pouch casing material 100, the first step compensating portion of the first cup, the step compensating portion of the second cup, the sealing portion and the cup connection may individually share one side with the rectangular folding portion and may be connected with each other through the folding portion. According to an embodiment of the present disclosure, the pouch casing material includes a first cup, a second cup and a cup connection formed integrally by denting predetermined portions in one pouch film having ductility. In addition, the outer circumferential portion of the pouch film in the non-dented portions forms a sealing portion configured to seal the pouch casing material, and a step compensating portion configured to compensate for the difference in height of the first lateral side portion from the second lateral side portion is formed between the sealing portion and the third lateral side portion. When all of the constitutional parts are formed integrally in one sheet of pouch film as mentioned above, a folding portion 160 that does not contribute to formation of the outer surface of the secondary battery is formed among the first step compensating portion of the first cup, the step compensating portion of the second cup, the sealing portion and the cup connection. According to an embodiment of the present disclosure, the folding portion allows folding of the pouch casing material 100 to form the electrode assembly receiving portion, and may be folded adequately when sealing the outer circumferential surface so that it may be inserted into the secondary battery. When the folding portion 160 is cut and removed, a vacant space is generated among the first step compensating portion of the first cup, the step compensating portion of the second cup, the sealing portion and the cup connection, and thus sealing of them may not be accomplished. In this case, a separate sealing portion should be prepared. Therefore, it is preferred to fold and insert the folding portion into the inside as mentioned above.

Figure 6:
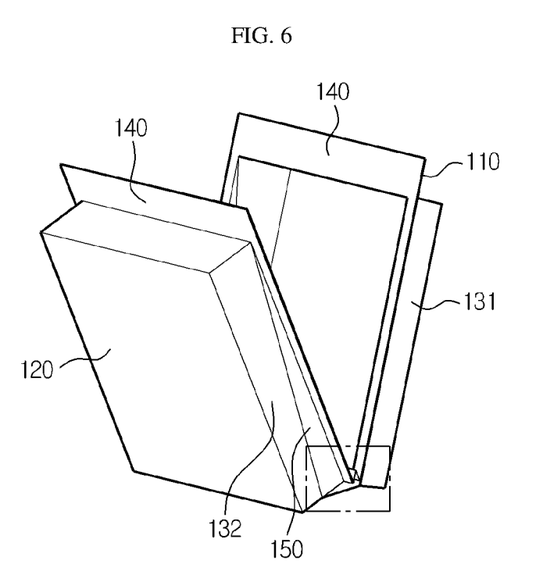
FIG. 6 shows a particular embodiment of the mechanism of folding a folding portion and a sealing portion connected to the folding portion, when assembling the pouch casing material according to another embodiment of the present disclosure.
Figure 7:
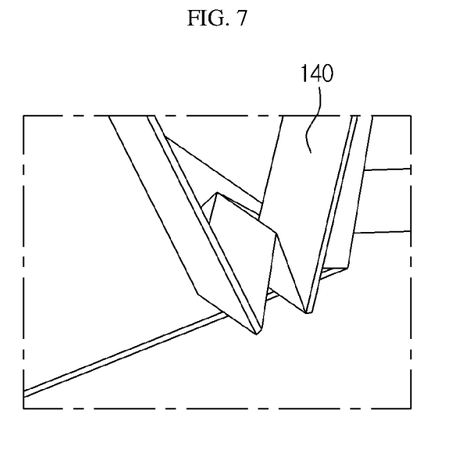
FIG. 7 is an enlarged view of portion A of FIG. 6.
Figure 8:
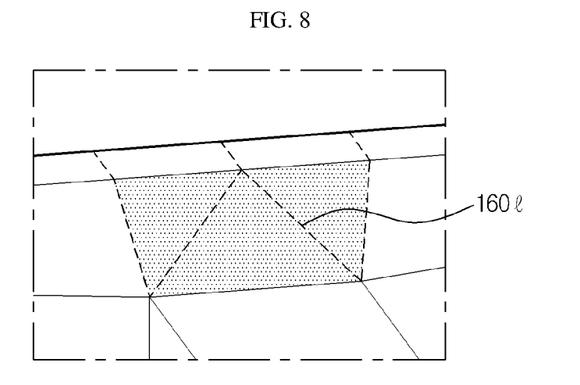
FIG. 8 is an enlarged view of portion A of FIG. 4.

FIG. 6 and FIG. 7 show schematic views illustrating a process of folding the folding portion 160 and inserting it into the inside of the secondary battery. In addition, FIG. 8 is an exaggerated view of portion A in FIG. 4, wherein the indicated dotted lines 160/function as folding lines so that the folding portion may be folded and inserted into the inside of the battery.

In another aspect, there is provided a secondary battery including the pouch casing material. The secondary battery includes an electrode assembly and an electrolyte in the pouch casing material according to the present disclosure, and may be obtained by introducing the electrode assembly and electrolyte to the pouch casing material, followed by sealing.

According to an embodiment of the present disclosure, adhesion of the sealing portion 40 of the pouch casing material may be carried out by hot fusion, or the like. The pouch casing material may include an outer insulating layer, a metallic layer and an inner insulating layer. Herein, the outer insulating layer may include an insulating material, such as polyethylene terephthalate (PET) resin or nylon resin, in order to ensure insulation between the secondary battery and the outside thereof. Particularly, the outer insulating layer is used for the purpose of protecting the metallic layer against the external pressure or force. Thus, it is preferred that the outer insulating layer includes a biaxially oriented polyester resin layer and/or oriented polyamide resin layer, considering the weathering resistance, chemical resistance and moldability of the casing material. The outer insulating layer may have a thickness of 5-50 μm, particularly 15-30 μm. When the outer insulating layer is too thin, pinholes may be generated in the layer itself and the effect of protecting against the external force is degraded.

Particular examples of the polyester resin may include polyethylene terephthalate (PET), polybutylene terephthalate (PBT), polyethylene naphthalate (PEN), polybutylene naphthalate (PBN), copolyester or polycarbonate (PC) films. As a biaxially oriented polyamide film resin, at least one selected from the group consisting of nylon 6, nylon 6.6, copolymer of nylon 6 with nylon 6.6, nylon 6.10 and polymetaxylene adipamide (MXD6) may be used to form a single layer or composite layer. In addition, a polyolefin resin having improved heat resistance, weathering resistance and chemical resistance may be applied to form the layer. The outer insulating layer may be adhered to the metallic layer through a method, such as dry lamination, extrusion lamination, or the like.

According to an embodiment of the present disclosure, the inner insulating layer includes a modified polypropylene, such as casted polypropylene (CPP), hot melt polymer resin, such as terpolymer of polypropylene, butylene and ethylene, or the like. The hot melt polymer resin functions as a sealant for adhesion of the upper and lower pouches. The inner insulating layer may be coated or laminated on the other side of the metallic layer and may be formed to have a thickness of 20-40 μm, particularly 30-40 μm.

According to an embodiment of the present disclosure, the metallic layer is a metallic thin film, and may include a metal selected from the group consisting of copper (Cu), aluminum (Al), nickel (Ni), iron (Fe), carbon (C), chromium (Cr), manganese (Mn) and alloys thereof. However, the metallic layer is not limited thereto. Preferably, the metallic layer includes aluminum.

The electrode assembly 200 includes a cathode plate and an anode plate with a separator interposed therebetween. Herein, the electrode assembly 200 may have a structure in which one cathode plate and one anode plate are wound with a separator interposed therebetween, or a structure in which a plurality of cathode plates and a plurality of anode plates are stacked with separators interposed therebetween. In addition, each of the cathode plate and the anode plate may be formed by applying active material slurry to an electrode current collector. In general, the slurry may be formed by agitating a particulate active material, supplementary conductor, binder and a plasticizer with a solvent added thereto.

Meanwhile, the electrode assembly 200 may have a non-coated portion where no slurry is applied to the electrode plate. The non-coated portion may be provided with an electrode tab corresponding to each electrode plate. In other words, a cathode tab is attached to the cathode plate of the electrode assembly and an anode tab may be attached to the anode plate of the electrode assembly. The cathode tab and the anode tab are connected electrically to a cathode lead and an anode lead, respectively, to form electrode terminals 210. The electrode terminals 210 are drawn to the outside of the pouch casing material 100.

In addition, other battery elements not described herein, such as a separator, conductive material, binder resin and an electrolyte, may include elements currently used in the field of batteries, particularly lithium secondary batteries.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

DESCRIPTION OF ELEMENTS

Pouch casing material: 10*a*, 10*b*, 100
Electrode assembly: 20, 200
Electrode terminal: 21, 210
First cup: 11*a*, 11*b*, 110
Second cup: 12*a*, 12*b*, 120
Cup connection: 130
Sealing portion: 40, 140
First lateral side portion: 111, 121
Second lateral side portion: 112, 122
Third lateral side portion: 131, 132
Step compensating portion: 150
Folding portion: 160
Total length: La

What is claimed is:

1. A pouch casing material which comprises:
a first cup and a second cup stacked in such a manner that the insides of the cups face each other to form an electrode assembly receiving portion capable of enclosing an electrode assembly, the first cup and the second cup are spaced apart from each other with a cup connection having a predetermined width W interposed therebetween, and sealing portions extended from the cups and cup connection are formed integrally on the outer circumferential surface of the pouch casing material,
wherein each of the cups comprises a first lateral side portion extended from the cup connection and a second lateral side portion facing the first lateral side portion,
wherein the first lateral side portion and the second lateral side portion of each of the cups are connected with each other through two third lateral side portions facing each other,
wherein the sum of the height Ha1 of the first lateral side portion of the first cup, the height Ha2 of the first lateral side portion of the second cup and the width W equals to the sum of the height Hb1 of the second lateral side portion of the first cup and the height Hb2 of the second lateral side portion of the second cup,
wherein a step compensating portion configured to compensate for a difference in height of the first lateral side portion from the second lateral side portion is provided between the third lateral side portion and the sealing portion, and the step compensating portion is formed as a triangle sharing one side with the third lateral side portion.

2. The pouch casing material according to claim 1, wherein the electrode terminals of the electrode assembly enclosed in the pouch casing material are drawn out from the gap of the sealing portions extended from the second lateral side portions of the first cup and the second cup.

3. The pouch casing material according to claim 1, wherein the length of the side connected to the first lateral side portion is shorter than the length of the side connected to the second lateral side, in the third lateral side portion.

4. The pouch casing material according to claim 1, wherein the length of one side of the step compensating portion extended from one side of the first lateral side portion equals to or larger than the difference in height of the first lateral side portion from that of the second lateral side portion.

5. The pouch casing material according to claim 1, wherein the third lateral side portion and the step compensating portion form one inner side portion of the electrode assembly receiving portion of the pouch casing material.

6. The pouch casing material according to claim 1, wherein the step compensating portion protrudes out from the plane of the third lateral side portion toward the outside, when assembling the pouch casing material.

7. The pouch casing material according to claim 1, wherein the first step compensating portion of the first cup, the step compensating portion of the second cup, the sealing portion and the cup connection individually share one side with a rectangular folding portion and are connected one another through the folding portion.

8. The pouch casing material according to claim 7, wherein the folding portion is folded toward the inside of the pouch casing material when the electrode assembly is enclosed, and thus does not protrude toward the outside.

* * * * *